United States Patent [19]

Kunert

[11] Patent Number: 5,733,673
[45] Date of Patent: Mar. 31, 1998

[54] METHOD AND APPARATUS TO DETECT IMMINENT BATTERY REMOVAL IN A PORTABLE ELECTRONIC DEVICE

[75] Inventor: Steven R. Kunert, Cedar Rapids, Iowa

[73] Assignee: Norand Corporation, Cedar Rapids, Iowa

[21] Appl. No.: 482,643

[22] Filed: Jun. 7, 1995

[51] Int. Cl.⁶ .................................................. H01M 2/10
[52] U.S. Cl. ...................... 429/1; 429/9; 429/97
[58] Field of Search ............................. 429/1, 9, 96, 97, 429/100, 121, 123, 151, 153, 154; 307/64, 66

[56] References Cited

U.S. PATENT DOCUMENTS

| | | | |
|---|---|---|---|
| 4,690,878 | 9/1987 | Nakamura | 429/1 |
| 5,212,021 | 5/1993 | Smith et al. | 429/9 |
| 5,402,008 | 3/1995 | St. John | 307/64 |

*Primary Examiner*—M. Nuzzolillo
*Attorney, Agent, or Firm*—Suiter & Associates PC

[57] ABSTRACT

A method and apparatus to detect the imminent removal of the battery from a portable electronic device and to automatically shut off said device before electrical power from the battery is lost.

9 Claims, 2 Drawing Sheets

METHOD AND APPARATUS TO DETECT IMMINENT BATTERY REMOVAL IN A PORTABLE ELECTRONIC DEVICE

TECHNICAL FIELD

The invention relates generally to methods for making battery interconnections and in particular to methods and apparatus for detecting when the batteries of a portable electronic device are being removed so that the device can be automatically shut off before electrical power from the main batteries is lost.

BACKGROUND OF THE INVENTION

Batteries are a convenient source of electrical power for portable electronic devices. Non-rechargeable batteries, however, normally have a limited life and must be replaced periodically. Rechargeable batteries typically have a longer useful life than non-rechargeable batteries, but they too may at times require removal or replacement. When an electronic device's main batteries must be removed, it is usually desirable to have the device switched off to avoid damage to the device or loss of the data stored therein. Nevertheless, the forgetful or untrained user may often fail to switch the device off before removing its main batteries.

Consequently, it would be desirable to have a method of detecting when the main batteries of a portable electronic device were being removed, and for automatically shutting off the device or switching to a backup battery before electrical power from said main batteries was lost.

SUMMARY OF THE INVENTION

Therefore, it is the object of the present invention to provide a simple method and apparatus for electromechanically detecting the imminent removal of the main batteries from a portable electronic device so that the device can automatically shut itself off or switch to backup battery power before electrical power from the main batteries is lost.

Principle features and advantages of the present invention will become apparent from the following description and accompanying drawings, which set forth by way of illustration and example specific embodiments of the invention.

DETAILED DESCRIPTION

Figure 1:
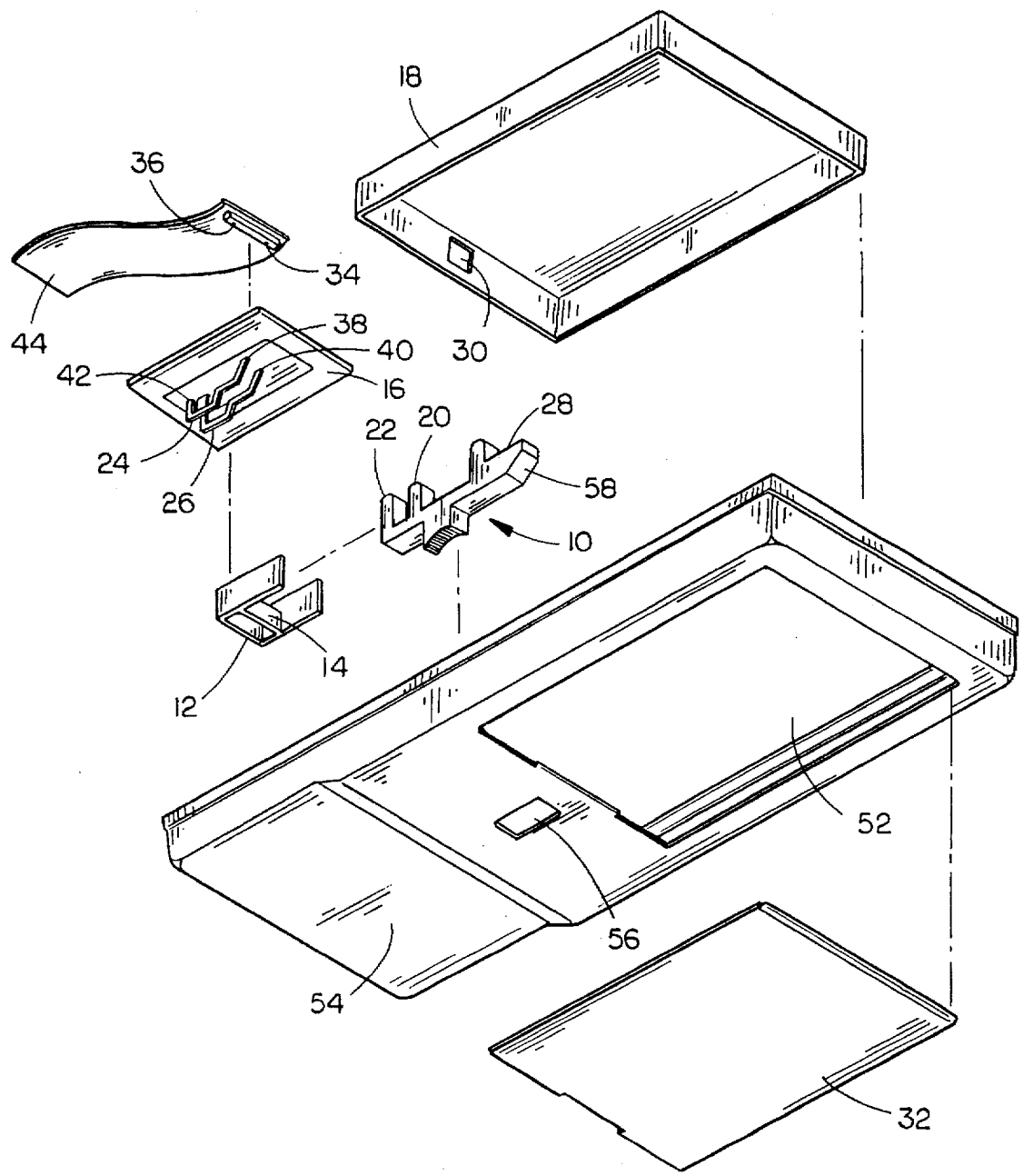
FIG. 1 is an exploded view of the preferred embodiment of the invention.

FIG. 1 is an exploded view of the preferred embodiment of the invention. A large, rectangular aperture 52 in the housing 54 of the portable electronic device allows insertion of a battery or batteries into the device. A smaller rectangular aperture 56 adjacent to the large aperture allows access to the latch block 58 switch surface 10. A flange 12 and rib 14 are attached to the housing 54 mate with the cover plate 16 to form a rectangular channel in which the latch block 58 can slide. A battery compartment shell 18 which consists of a cavity into which a battery or batteries can be placed is attached to the inside face of the housing 54 around the aperture 52.

The latch block 58 is inserted within the channel formed by flange 12 and rib 14 and is retained by the cover plate 16. Two ribs 20 and 22 molded into the latch block 58 provide contact surfaces that engage the spring contacts 24 and 26 when the latch block 58 is slid to the unlatched position. The latch block 58 contains a surface 10 which protrudes through the housing 54 forming a switch and a prong 28 which extends through a notch 30 in the forward wall of the battery compartment shell 18 to hold the battery compartment cover 32 securely in place enclosing the battery compartment.

The pins 34 and 36 of the spring contacts 24 and 26 are press fit through holes 38 and 40 in a recessed cavity 42 of the cover plate 16. These pins 34 and 36 are then soldered to a flexible circuit 44 which is connected to the main circuit board of the device (not shown).

Figure 2:
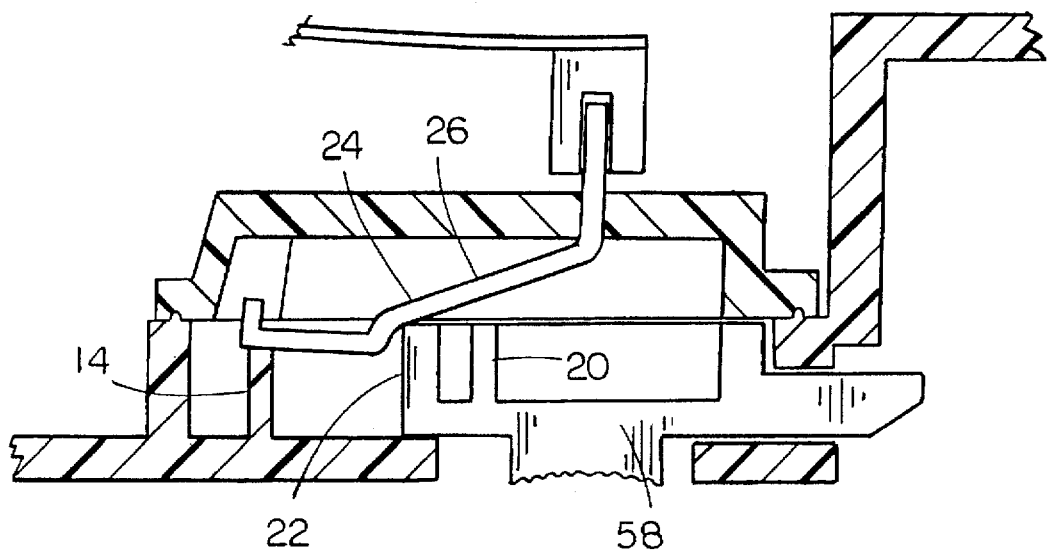
FIG. 2 is a sectional side elevational view of the embodiment of the invention in FIG. 1 showing the latch in the latched position.
Figure 3:
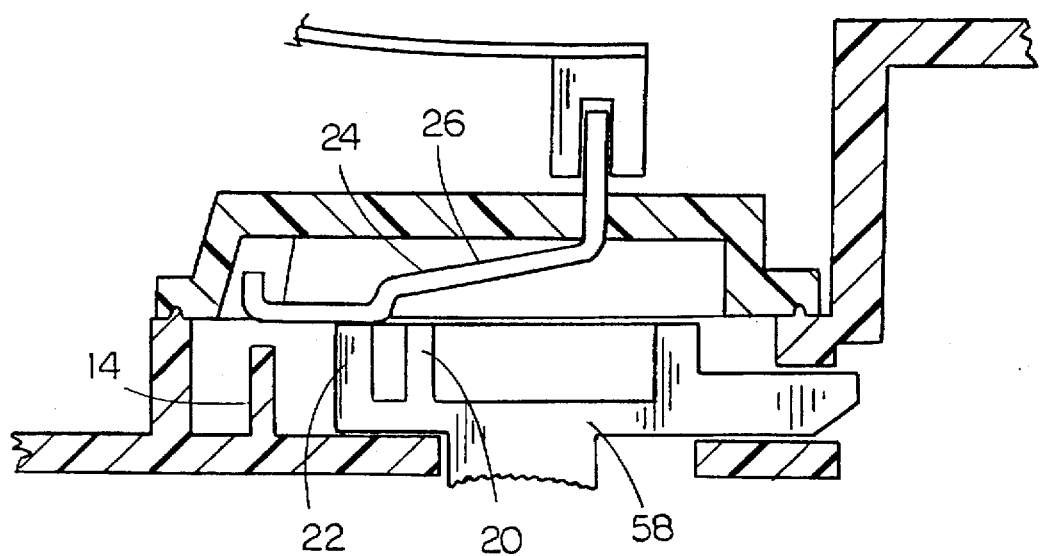
FIG. 3 is a sectional side elevational view of the embodiment of the invention in FIG. 1 showing the latch in the unlatched position.

FIGS. 2 and 3 are sectional side elevational views of the invention. FIG. 2 shows the latch block 58 in the latched position. The two spring contacts 24 and 26 are not in contact with the latch block ribs 20 and 22 and are allowed to rest on a rib 14 protruding from the device's bottom housing 54. FIG. 3 shows the latch block 58 in the unlatched position. Ribs 20 and 22 on the latch block are in contact with the two spring contacts 24 and 26 completing a circuit between them.

OPERATION OF THE INVENTION

As the need arises to remove the batteries of the portable electronic device, the latch block is slid from the latched position shown in FIG. 2 to the unlatched position shown in FIG. 3 to allow removal of the battery compartment cover. Ribs molded into the latch block make contact with two spring metal contacts completing a circuit between them. The portable electronic device reacts to the completion of the circuit by executing a routine causing an orderly shut-down of the processor or switch over to backup battery power before the main batteries can be removed.

When the main batteries are inserted into the portable electronic device, the battery compartment cover is replaced. The latch block is slid from the unlatched position to the latched position to retain the battery compartment cover. The latch block ribs dis-engage the two spring contacts breaking the circuit between them. The portable electronic device can then be switched on.

What is claimed is:

1. Apparatus for detecting battery removal from a battery powered device, comprising:
   a) a battery housing, having an access aperture, for removably receiving a battery,
   b) a latching system, having a closed state and an open state, for securing a battery within said battery housing when said latching system is in the closed state and for permitting removal of a battery when said latching system is in the open state, and
   c) a signaling device for signaling the state of said latching system to an electrical component of the battery powered device.

2. An apparatus according to claim 1 wherein said signaling device sends an electrical signal to the electrical component of the battery powered device when said latching system is in the open state.

3. An apparatus according to claim 1 wherein the battery powered device further comprises an open circuit and wherein said signaling device signals the electrical component of the battery powered device by completing the open circuit of the battery powered device.

4. An apparatus according to claim 1 wherein the electrical component of the battery powered device initiates an orderly shutdown of the battery powered device upon determining that said latching system has been changed from said closed state to said open state.

5. An apparatus according to claim 1 wherein the battery powered device further comprises a back-up battery capable of providing operating power to the battery powered device, and wherein the electrical component is capable of configuring the battery powered device to receive operating power from said backup battery upon determining that said latching system has been changed from the closed state to the open state.

6. An apparatus according to claim 1 wherein the battery powered device further comprises a battery housing cover.

7. An apparatus according to claim 1 wherein said latching system secures said battery housing cover to said battery housing when said latching system is in the closed state so that a battery in the battery housing cannot be removed.

8. An apparatus according to claim 1 wherein said latching system permits said battery housing cover to be removed when said latching system is in the open state so that a battery in the battery housing can be removed.

9. An apparatus according to claim 3 wherein the open circuit of the battery powered device includes a first spring contact and a second spring contact and wherein said signal device completes the open circuit by conductively connecting said first spring contact to said second spring contact.

* * * * *